United States Patent [19]
Vollaro

[11] Patent Number: 4,881,711
[45] Date of Patent: Nov. 21, 1989

[54] FULL FORMAT VARIABLE WIDTH FILM HOLD-DOWN DEVICE

[75] Inventor: Joseph F. Vollaro, Pleasantville, N.Y.

[73] Assignee: The Perkin-Elmer Corporation, Norwalk, Conn.

[21] Appl. No.: 170,472

[22] Filed: Mar. 21, 1988

[51] Int. Cl.$^4$ .............................................. G03B 27/60
[52] U.S. Cl. ...................................... 248/362; 269/21; 355/73
[58] Field of Search ................. 248/309.3, 262, 363; 269/21; 51/235; 355/73, 76

[56] References Cited

U.S. PATENT DOCUMENTS

| | | | |
|---|---|---|---|
| 2,317,348 | 4/1943 | Wekeman | 269/21 |
| 2,895,706 | 7/1959 | Blatherwick | 269/21 |
| 3,115,808 | 12/1963 | Durst | 248/363 |
| 3,164,690 | 9/1964 | Hoffman | 248/363 |
| 3,236,488 | 2/1966 | Wilson | 51/235 |
| 3,584,954 | 6/1971 | Nast | 248/363 |
| 3,588,079 | 6/1971 | Addy | 269/21 |
| 3,645,621 | 2/1972 | Wally | 355/73 |
| 4,197,005 | 4/1980 | Sippel | 355/73 |
| 4,324,487 | 4/1982 | Nishihama | 355/73 |
| 4,378,155 | 3/1983 | Nygaard | 355/73 |
| 4,526,445 | 7/1985 | Wogoman | 269/21 |

FOREIGN PATENT DOCUMENTS

| | | | |
|---|---|---|---|
| 3422767 | 1/1986 | Fed. Rep. of Germany | 355/76 |
| 2157012 | 10/1985 | United Kingdom | 355/76 |

*Primary Examiner*—Ramon O. Ramirez
*Assistant Examiner*—Robert A. Olson
*Attorney, Agent, or Firm*—Ronald G. Cummings; Paul A. Fattibene; Edwin T. Grimes

[57] ABSTRACT

A variable width transparent photographic film vacuum hold-down device. Two spaced parallel vacuum slits formed on a flat platen are connected by the longitudinal edges of the film, and when covered by a flexible cover sheet form two vacuum channels holding the film flat and unobscured to the extreme edges. Any film width not exceeding the length of the vacuum slits is held without any modification or adjustment to the device. Any length of film can be used.

6 Claims, 1 Drawing Sheet

FULL FORMAT VARIABLE WIDTH FILM HOLD-DOWN DEVICE

FIELD OF THE INVENTION

This invention relates generally to a film hold-down device, and more particularly to a self-adjusting variable width spooled film vacuum hold-down device.

BACKGROUND OF THE INVENTION

As the photographic film art advances different types of film are introduced. These different types of film often have different widths. Additionally, the films are of much improved resolution requiring hold-down devices that hold the film down flat with great dimensional accuracy and with no distortion. These advances have created the need for new devices to handle the film more accurately and with greater ease.

Typically, hold-down devices comprise tables for accommodating a fixed size of photographic film that are used in conjunction with an optical imaging device to view or analyze the film. Hold-down devices have included edge clamps which clamp onto the edge of the photographic film. This is undesirable because it results in a loss of image at the edge. Weights have also been used to hold down the photographic film. But weights have resulted in distortion of the table or platen resulting in a loss of accuacy as well as a loss of that portion of the image under the weights. Because of the very high resolutions required in some applications these distortions are unacceptable.

Hold-down devices have also been used which have a vacuum slit along the peripheral edges of a platen to hold down the edges of a particular size of film. However, the peripheral edge vacuum film hold-down devices cannot adapt to various widths of film. Therefore, a different platen is needed for each different size of film.

Many of these devices do not provide for a uniform hold-down pressure over the entire surface of the photographic film. This results in the liklihood of unacceptable distortion due to the film not being held perfectly flat.

Another type of photographic film hold-down device that has been used is a table or platen having pinholes predetermindly spaced therein to supply a vacuum which holds down the film. The pinhole vacuum hold-down device is not applicable to a device requiring a transparent table or platen.

While all of these photographic film hold-down devices have adequately held down film for various applications none of them can adequately address the problem of automatically adapting to different widths of film while keeping the film flat and very precisely positioned within tight tolerances, and without loss of images near the edges of the film.

SUMMARY OF THE INVENTION

The present invention is directed to a photographic film hold-down device that automatically adjusts to variable widths of film and is capable of holding down a portion of a continuous spool of film. The present invention also provides for a uniform pressure over the portion of film being viewed, including the extreme edges, and does not obscure any portion of the platen area. This is accomplished with a rectangular transparent platen or table having a pair of parallel slits therein. The slits are separated by a distance sufficient to view the film over a desired portion or field. Also, the slits are longer than the widest film anticipated being used. A transparent flexible cover sheet is placed over the parallel slits and the portion of the photographic film to be viewed such that the film extends beyond the two edges of the cover sheet parallel to the slits. A vacuum supplied to the two parallel slits forces the transparent cover sheet into intimate contact with the portion of film to be viewed. This provides very accurate placement of the film without distortion. Each of the two edges of the length of the film create a gap communicating with, and perpendicular to, the two parallel slits. The gaps open to the atmosphere resulting in a slight leakage of vacuum. This leakage has virtually no effect on vacuum pressure as long as the vacuum pump has capacity that is large relative to the leak. As a result, a film having any width up to slightly less than the length of the two parallel slits can be automatically accommodated by the present invention.

Accordingly, it is an objective of the present invention to provide a variable width film hold-down device capable of adjusting to different widths of film automatically without modification.

It is a further objective of the present invention to provide a distortion free film hold-down device.

It is a feature of the present invention that a gap is formed between the flexible cover and the platen along each longitudinal edge of the film.

It is an advantage of the present invention that all of the film on the platen, including the extreme edges, is uniformly pressed into intimate contact with the platen.

It is an advantage of the present invention that the edges of the film are not obscured.

It is a further advantage of the present invention that no adjustments are necessary to accommodate varying widths of film.

It is yet a further advantage of the present invention that any length of film can be used.

These and other objectives, features, and advantages will become readily apparent in view of the following more detailed description.

DETAILED DESCRIPTION OF THE PREFERRED EMBODIMENT

Figure 1:
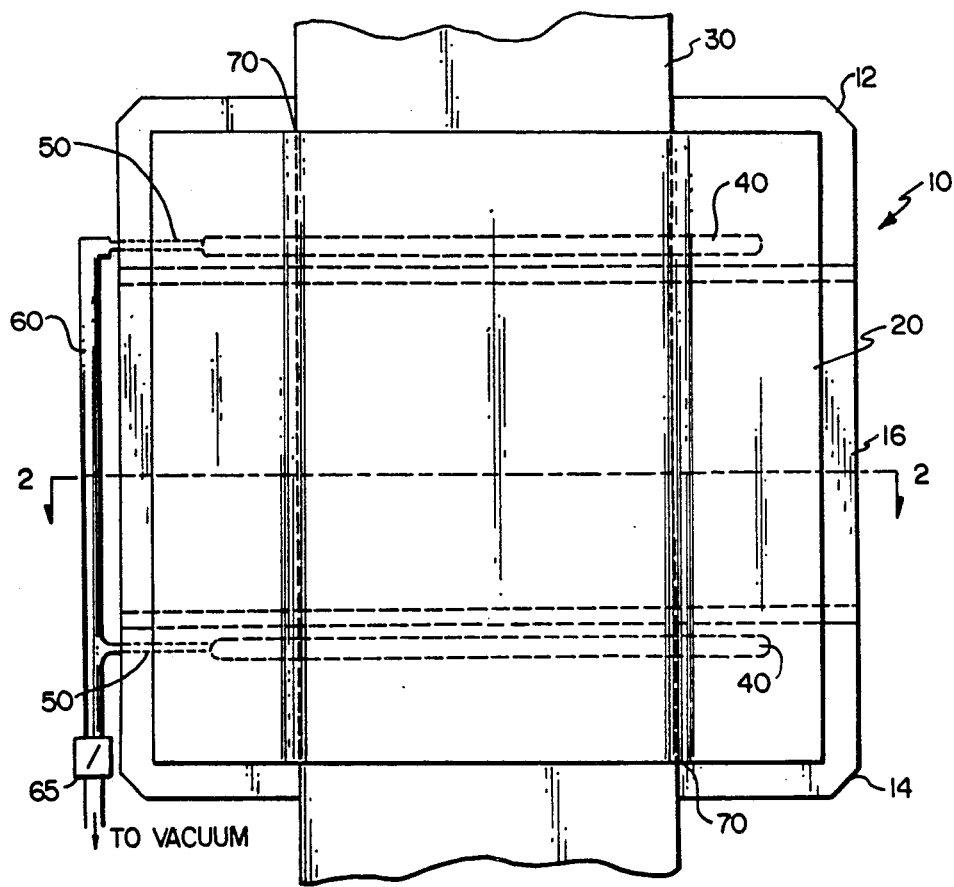
FIG. 1 is a plan view of the present invention.

FIG. 1 illustrates the present invention. As is illustrated in FIG. 1, platen or table 10 is comprised of a first opaque block 12 and a second opaque block 14. Between the first opaque block 12 and the second opaque block 14 is positioned a planar transparent member 16. Member 16 is transparent to permit viewing of the film 30 therethrough. Transparent member 16 should be of a size sufficient to view the largest image intended to be viewed from film 30. Transparent member 16 should be flat and rigid to avoid any distortion when film 30 is placed thereon. The first and second opaque blocks 12 and 14 each have a vacuum slit 40 on one surface thereof. Vacuum slits 40 should have a length longer than the width of the widest film anticipated being used. This is to permit the ends of vacuum slits 40 to extend beyond the longitudinal edges of film 30. Vacuum slits 40 are connected to an external side of the first and second opaque blocks 12 and 14 by vacuum tunnels 50. Vacuum tunnels 50 are then connected to a vacuum source (not shown) by vacuum hose 60. The vacuum supplied to slits 40 can be controlled by vacuum valve means 65. Transparent cover sheet 20 covers both vacuum slits 40 and the width of film 30 over a portion thereof. Transparent sheet 20 should be flexible enough to conform to the shape and thickness of the film 30, but rigid enough to permit a gap 70 to be formed between the surface of platen 10 and each longitudinal edge of film 30. The vacuum from slits 40 is communicated to gaps 70 at the intersection of the longitudinal edges of film 30 and extends along gaps 70 opening to the atmosphere or ambient environment in which the device is placed. Due to the small size of the gaps 70 the vacuum source is sufficient to maintain the vacuum under the surface of the transparent cover sheet 20. The transparent cover sheet 20 is thereby held in intimate contact with the film 30 and the surface of platen 10. Preferably, the surface of platen 10, comprised of first and second opaque blocks 12 and 14 and transparent member 16, form a common plane.

In operation, film 30 can be supplied in spools. A portion of film 30 is then placed along the surface of platen 10 while transparent cover sheet 20 is lifted. To facilitate operation transparent cover sheet 20 can be hinged on one side to platen 10. Once film 30 is positioned with the image to be viewed located over transparent member 16 such that the ends of vacuum slits 40 extend beyond both longitudinal edges of film 30 transparent cover sheet 20 can be lowered. Once lowered into position vacuum valve means 65 can be positioned permitting a vacuum to be supplied to vacuum slits 40. If desired, the vacuum can be supplied to vacuum slits 40 before the lowering of coversheet 20 to assist in holding the film in position. Transparent cover sheet 20 is then forced against film 30 and platen 10. If necessary a squeegy can be used during vacuuming to assist in the removal of any trapped air, or to quicken the evacuation of air under sheet 20. The film 30 is thereby held very accurately without any distortion. Also, the entire field can be viewed without loss of image at the longitudinal edges of the film 30. Additionally, there is no distortion due to mechanical clamping devices, or uneven stresses on the platen surfaces. The image can now be viewed with any conventional well known optical viewing apparatus. To remove the film 30 or reposition the film 30 to view another image the vacuum can be removed by vacuum valve means 65 and the transparent cover sheet 20 lifted thereby freeing the film 30. If desired, the vacuum can remain on during repositioning or removal of the film 30. When a different size or width of film is to be viewed no modification of the device needs to be made and the same procedure is used irrespective of film width.

Figure 2:
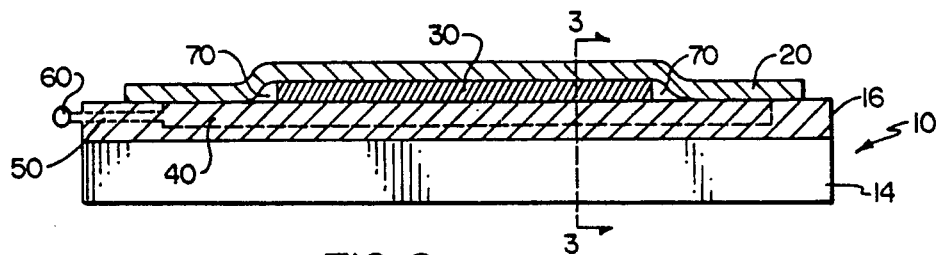
FIG. 2 is a cross-section taken along line 2—2 in FIG. 1.

In FIG. 2 gaps 70 can more easily be seen. When transparent cover sheet 20 covers film 30 the thickness of film 30 creates a discontinuity forming gaps 70. The size of gaps 70 are dependent on the physical properties of the transparent cover sheet 20. The more flexible the transparent cover sheet 20 the smaller the gaps 70 will be, and the more rigid the larger the gaps 70 will be when a vacuum is applied. A suitable material is a thin polyester film, such as Mylar. Mylar is a well known trademark for a polyester film supplied by du Pont. The thickness of the polyester film can be adjusted to provide sufficient gap size. It has been determined that the gap size is not critical, and that the size can vary greatly without compromising performance.

Figure 3:
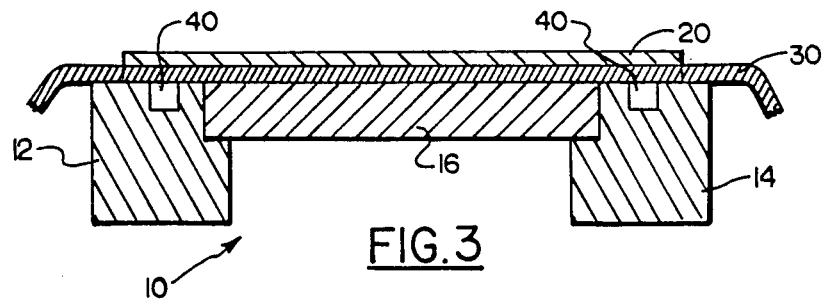
FIG. 3 is a cross-section taken along line 3—3 in FIG. 2.

In FIG. 3 platen 10 and the vacuum slits 40 therein can more easily be seen. Slits 40 are illustrated as rectangular in cross-section, but can be of any desired shape. Additionally, platen 10 is illustrated in three sections, first and second opaque blocks 12 and 14 and transparent member 16, but the platen 10 can also be made of a single piece.

Although the preferred embodiment has been illustrated and described, it will be obvious to those skilled in the art that various modifications may be made without departing from the spirit and scope of this invention.

What is claimed is:

1. A variable width film hold-down device comprising:
   a platen;
   said platen having a pair of substantially parallel slits therein;
   a section of elongated film traversing said pair of substantially parallel slits, the width of said elongated film being less than the length of one of said substantially parallel slits;
   a transparent flexible cover sheet covering said pair of slits and said section of film so that a gap is formed at each edge along the length of film and the surface of said platen which opens to the environment; and
   vacuum means for applying a vacuum to said pair of slits.

2. A varible width film hold-down device as in claim 1 wherein said cover sheet is a thin film polyester.

3. A variable width film hold-down device as in claim 1 wherein said vacuum means further comprises;
   a vacuum line connecting said pair of slits; and
   a valve means, connected to said vacuum line, for selectively applying and removing a vacuum.

4. A variable width film hold-down device comprising:
   an opaque first block having a first slit therein;
   a transparent flat surface member, one end of said member being attached to an end of said first block parallel to said first slit;
   an opaque second block having a second slit therein attached to the other end of said member;
   said first and second slits being substantially parallel and not interconnecting on the surface plane of said first block, second block, and transparent flat surface member and spaced sufficiently to permit a portion of film to be viewed therebetween, each said first and second slits having a length greater than the anticipated film width;
   a transparent flexible cover sheet covering said first and second slits whereby a gap is formed at each edge along the length of film and the surface of said first block, second block, and a transparent flat surface member; and
   vacuum means for applying a vacuum to said first and second slits.

5. A variable width film hold-down device as in claim 4 wherein:
   said first block, said member, and said second block form a single plane.

6. A method of holding down an elongated film comprising the steps of:
   positioning the film on a platen having a pair of substantially parallel slits therein, the elongated edges of the film traversing the pair of parallel slits and extending beyond them;

placing a transparent flexible cover over the pair of substantially parallel slits and the portion of the elongated edges of the film between the slits; and evacuating the pair of slits whereby a gap opening to the environment is formed along the elongated edges of the film between the platen and cover.

* * * * *